(12) United States Patent
Mitzev

(10) Patent No.: US 10,426,247 B2
(45) Date of Patent: Oct. 1, 2019

(54) SURFBOARD CARRIER ASSEMBLY

(71) Applicant: Cecily Mitzev, San Clemente, CA (US)

(72) Inventor: Cecily Mitzev, San Clemente, CA (US)

(*) Notice: Subject to any disclaimer, the term of this patent is extended or adjusted under 35 U.S.C. 154(b) by 0 days.

(21) Appl. No.: 16/130,130

(22) Filed: Sep. 13, 2018

(65) Prior Publication Data

US 2019/0098988 A1 Apr. 4, 2019

Related U.S. Application Data

(60) Provisional application No. 62/565,453, filed on Sep. 29, 2017.

(51) Int. Cl.
| | | |
|---|---|---|
| *B60R 9/08* | (2006.01) | |
| *A45F 3/15* | (2006.01) | |
| *B60R 9/04* | (2006.01) | |
| *A45F 3/14* | (2006.01) | |

(52) U.S. Cl.
CPC .............. *A45F 3/15* (2013.01); *B60R 9/04* (2013.01); *B60R 9/08* (2013.01); *A45F 2003/142* (2013.01)

(58) Field of Classification Search
CPC ........ A45F 2003/142; B60R 9/04; B60R 9/08
See application file for complete search history.

(56) References Cited

U.S. PATENT DOCUMENTS

| | | | | |
|---|---|---|---|---|
| 3,377,007 A | * | 4/1968 | Gayler, Jr. .......... | B63B 35/7946 224/250 |
| 4,007,862 A | * | 2/1977 | Heftmann ................ | B60R 9/08 224/329 |
| 4,393,986 A | * | 7/1983 | Sirey ................... | B63B 35/7946 224/413 |
| 4,724,989 A | * | 2/1988 | Silberberg ................ | A45F 3/14 224/250 |
| 4,793,535 A | * | 12/1988 | Johnson .................. | B60R 9/048 206/315.1 |
| 5,067,644 A | * | 11/1991 | Coleman ................. | B60R 9/048 224/309 |
| 5,083,692 A | * | 1/1992 | Treese ................ | B63B 35/7946 224/250 |
| 6,230,951 B1 | * | 5/2001 | Anderson ................. | A45F 3/15 224/318 |
| 6,748,615 B1 | * | 6/2004 | Tiedemann ............ | B60N 2/882 5/640 |
| 8,157,110 B1 | * | 4/2012 | Drum ..................... | A01K 97/08 211/195 |
| 9,492,004 B1 | * | 11/2016 | Young ....................... | A45F 5/00 |
| 2002/0132538 A1 | * | 9/2002 | Hufham .............. | B63B 35/7933 441/75 |
| 2008/0057805 A1 | * | 3/2008 | Alexander .......... | B63B 35/7946 441/75 |
| 2012/0149259 A1 | * | 6/2012 | Proton ................ | B63B 35/7946 441/75 |
| 2016/0121800 A1 | | 5/2016 | Bogoslofski et al. | |

* cited by examiner

*Primary Examiner* — S. Joseph Morano
*Assistant Examiner* — Jovon E Hayes
(74) *Attorney, Agent, or Firm* — David Duckworth

(57) ABSTRACT

A surfboard carrier assembly is provided including first and second ring assemblies. Each ring assembly includes a circular loop made of an elastic cord. Preferably, the circular loop's circumference can be adjusted. In addition, each ring assembly includes a cover which can be manipulated into a hollow doughnut shape so as to encapsulate a circular loop. Moreover, each ring assembly includes a pair of straps for affixing a ring assembly to a vehicle roof rack cross bar.

18 Claims, 6 Drawing Sheets

SURFBOARD CARRIER ASSEMBLY

RELATED APPLICATION

This application claims priority to U.S. Patent Application Ser. No. 62/565,453 filed on Sep. 29, 2017.

BACKGROUND OF THE INVENTION

The present invention relates to fixtures which can affix a surfboard to a vehicle. More particularly, the present invention relates to apparatus for affixing a surfboard to a vehicle roof rack. The present invention relates further to carriers for allowing a person to carry a surfboard. Since the present carrier assembly has usefulness for carrying a wide variety of small watercraft, for purposes herein the term "surfboard" is intended to be interpreted extremely broadly to include any small watercraft that can be operated in the surf including paddleboards, boogie boards, canoes and kayaks.

Surfboards are very popular for carrying out water sports upon the ocean and other bodies of water. Unfortunately, surfboards are very bulky and difficult to transport. Typically, they are too large to fit into a traditional vehicle and are often times too big to fit into the back of a standard pickup truck. For this reason, various apparatuses have been developed for carrying surfboards upon a vehicle. The most common apparatus utilizes the traditional vehicle roof rack which includes a pair of laterally extending cross bars which extend across the vehicle's roof. A surfboard is typically placed upon the rack and then affixed to the cross bars using straps or ropes. Preferably, these racks include some sort of padding to minimize any sort of damage to the surfboard. Though straps and ropes are low cost, they can be cumbersome and time consuming to use.

For this reason, a wide variety of more complicated apparatuses have been developed for affixing a surfboard to a vehicle. For example, U.S. Pat. No. 8,157,110 describes a roof rack including laterally extending cross bars having slots for receiving various objects such as fishing poles. Unfortunately, the apparatus is cumbersome and still requires straps or the like for affixing a surfboard to the apparatus. Similarly, U.S. Patent Publication No. 2016/0121800 describes a carrier assembly for carrying water sports equipment upon the roof of a vehicle. Unfortunately, the carrier assembly is extremely complicated including locking cams and arcuate members which would make the assembly unduly expensive.

U.S. Pat. No. 4,793,535 illustrates a more simplistic assembly including a bag having straps capable of synching down upon the periphery of a surfboard. The bag is then affixed to the top of the vehicle using straps or the like. Advantageously, the entire bag assembly can be removed from the vehicle and utilized for carrying a surfboard. Unfortunately, even this construction has drawbacks including a complicated strap construction.

Accordingly, there is a need for an improved ring assembly for affixing a surfboard to the roof of a vehicle.

There is also a need for an improved carrier assembly that is capable of being affixed to the roof of a vehicle which also allows a person to carry a surfboard, such as from their vehicle to a body of water.

SUMMARY OF THE INVENTION

The present invention is directed toward a surfboard carrier assembly for affixing a surfboard to the roof rack of a vehicle. Which includes two parallel cross bars which traverse the top of the vehicle. The surfboard carrier assembly includes a pair of ring assemblies wherein each ring assembly is affixed to a vehicle roof rack cross bar.

Each ring assembly includes an elastic cord, a cover, and one or more straps. The cord is made of a stretchable material and includes first and second ends which are affixed together so as to form a circular loop. The circular loop has a circumference which is preferably adjustable by adjusting how an end of the cord is affixed to the other end of the cord. The adjustment of the circular loop's circumference can be done utilizing various clips or knots, as can be determined by those skilled in the art. However, it is preferred that each loop has a relaxed circumference smaller than the surfboard circumference where the surfboard is intended to be affixed to a roof rack cross bar.

Meanwhile, the surfboard carrier assembly includes a pair of covers wherein each cover encapsulates a ring assembly's first or second circular loop. Preferably, the cover has an elongate rectangular shape wherein the opposing long edges are connected by a fastener such as a hook and pile fastener. The cover is made to wrap around and envelop a corresponding elastic cord to form a hollow doughnut shape. Preferably, each cover is made of a durable material having an elongation less than each ring assembly's cord.

Each ring assembly further includes a pair of straps for affixing a ring assembly's cover to a vehicle cross bar. Preferably, the straps are affixed to the cover so as to be positioned roughly at opposite sides of a surfboard positioned within the interior of a ring assembly. The straps can then be affixed to the underlying vehicle cross bar.

In a preferred embodiment, the surfboard carrier assembly includes a shoulder strap. The shoulder strap includes first and second ends wherein a first end is affixed to a first ring assembly and the shoulder strap's second end is affixed to a second ring assembly. The shoulder strap may have an adjustable length once a surfboard's front end and rear end have been inserted into a corresponding ring assembly, the shoulder strap can be utilized so as to enable a person to easily carry a surfboard.

In an alternative embodiment, the surfboard carrier assembly includes a carry bag. In a preferred embodiment the carry bag is a rectangular mesh bag having four corners wherein a first pair of corners are affixed to a first ring assembly and the opposite two corners are affixed to a second ring assembly.

Thus, it is an object of the present invention to provide an improved surfboard carrier assembly for affixing a surfboard to the roof of a vehicle.

It is still an additional object of the invention to provide a surfboard carrier assembly that is capable of being carried by a person.

Moreover, it is an object of the present invention to provide a surfboard carrier assembly that includes a storage compartment for storing additional items.

DETAILED DESCRIPTION OF THE INVENTION

Figure 1:
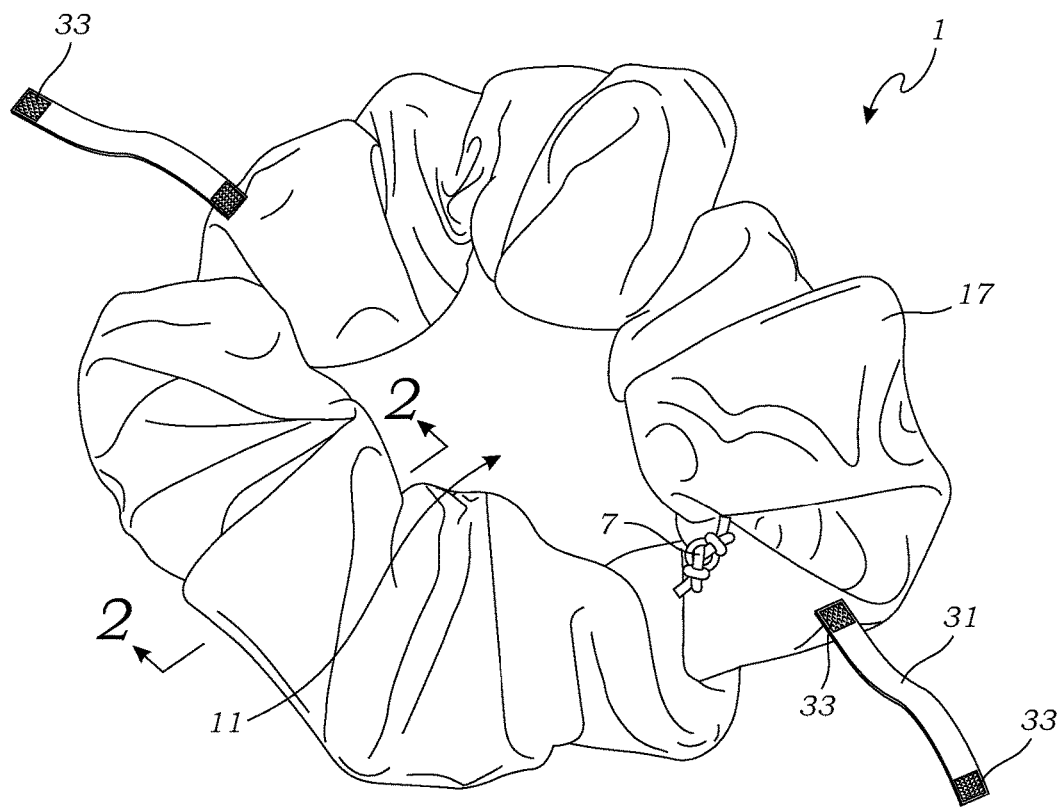
FIG. 1 is a front elevation view of one of the two ring assemblies which comprise the surfboard carrier assembly of the present invention.

The present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to specific embodiments illustrated.

With reference to FIGS. 1-9, the surfboard carrier assembly includes a pair of ring assemblies 1 which are utilized to affix a surfboard 61 to a vehicle roof rack's cross bars 53. Each ring assembly 1 includes three primary components, namely a cord 3, a cover 17, and one or more straps 31. The cord 3 is elongate and made of any material that is stretchable and relaxes back to its natural state when not under stress. In the preferred embodiment, the cord is made of rubber having a hardness of 40-50 ShoreA, and an elongation of 200%-500%. More preferably, the cord has an elongation of 350%-450%.

Figure 3:
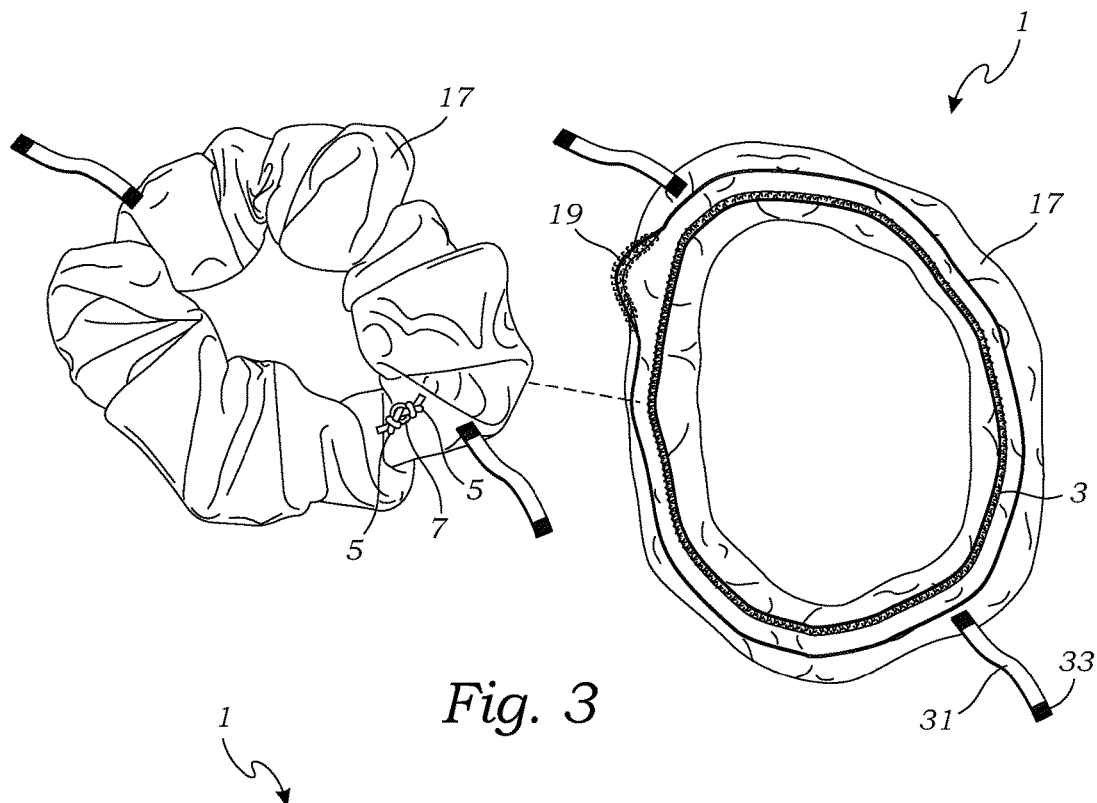
FIG. 3 is a is a side elevation view of one of the two ring assemblies which comprise the surfboard carrier assembly of the present invention illustrating the removal of the ring assembly's cover.

The cord ends 5 are affixed together to create a loop. The ends 5 of the cord 3 may be affixed together utilizing various fastener constructions known to those skilled in the art including various clips or even a knot 7 as illustrated in FIG. 3. Connecting the ends of the cord 3 forms a loop having a center hole 11 with a circumference 9. Importantly, the cord's ends 5 are connected so that the resulting loop has a relaxed circumference smaller than the surfboard's circumference where it is intended to be affixed to the roof rack cross bars 53. However, the loop is sufficiently large and the cord 3 is sufficiently stretchable so that the cord's circumference 9 can be stretched to accept the surfboard's circumference.

In the preferred embodiment, the cord's circumference 9 can be adjusted by utilizing a slidable clip (not shown) or by manually tying the ends 5 of the cord to either shrink or expand the cord's circumference 9. In preferred embodiments, the cord's circumference 9 is at least two (2) feet when in a relaxed (non-stretched) state. Such a small circumference may be needed to mount a small surfboard or bodyboard to a vehicle. However, the cord's relaxed circumference may be much larger, such as four (4) or more feet, to accept and affix to larger watercraft such as kayaks, canoes or paddleboards.

Figure 2:
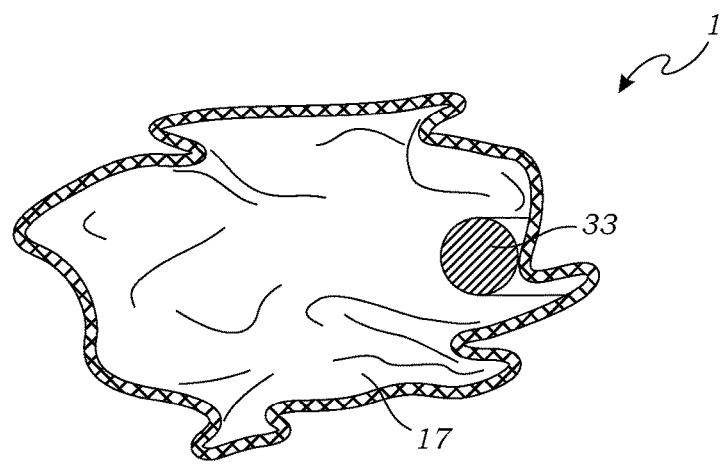
FIG. 2 is a cutaway view of one of the two ring assemblies which comprise the surfboard carrier assembly of the present invention.
Figure 4:
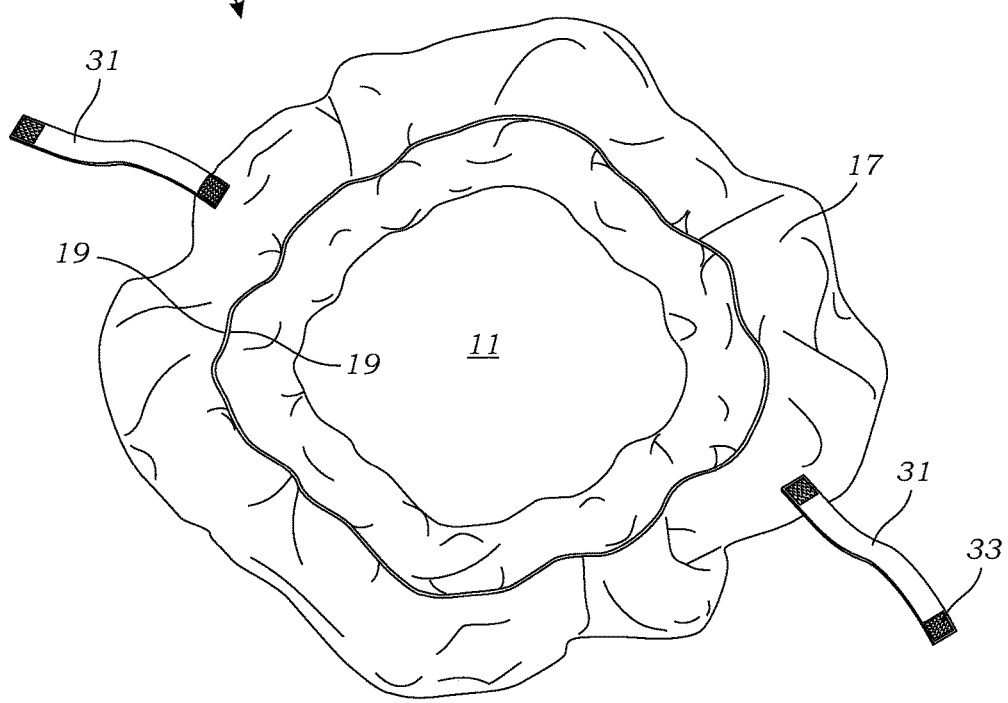
FIG. 4 is a rear elevation view of one of the two ring assemblies which comprise the surfboard carrier assembly of the present invention.

As best illustrated in FIGS. 2-4, the ring assembly's cover 17 wraps around the cord 3. To this end, the cover 17 has a doughnut shape that wraps around the cord 3. The cover 17 may be made of any flexible fabric material. However, it is preferred that the cover be made of a durable material having an elongation less than the elongation of the cord. Preferred cover materials include neoprene having an elongation of less than 350% and nylon having an elongation of less than 200%. The preferred cover material includes 40D Ripstop Nylon™ which includes reinforced threads interwoven with the nylon fabric to prevent tearing.

Preferably, the fabric is coated with polyurethane to provide weatherproofing, UV resistance and durability.

It is also preferred that the cover 17 be attachable and detachable to the cord 3. With reference to FIGS. 2 and 3, it is preferred that prior to being installed upon a cord, that the cover 17 has a substantially elongate rectangular shape wherein the opposed long sides of the rectangular shape form edges 19 which can be affixed or disengaged from one another. For installation upon a cord 3, the cover 17 is be wrapped around the cord and the edges 19 of the cover 17 are attached to one another to form a hollow doughnut shape where the cord is positioned within the cover's interior. Preferably, the cover's edges 19 can be disengaged so as to enable the cover 17 to be unwrapped and removed from the cord 3. Preferably, the edges 19 are affixed together by using a hook and pile fastener 23 or the like. As illustrated in FIG. 3, the cover is sufficiently large to bunch up when the cord is in a relaxed and unstretched condition, and as illustrated in FIG. 4 is sufficiently large so as to expand sufficiently when the cord is stretched to an extended condition to accept a surfboard.

Figure 8:
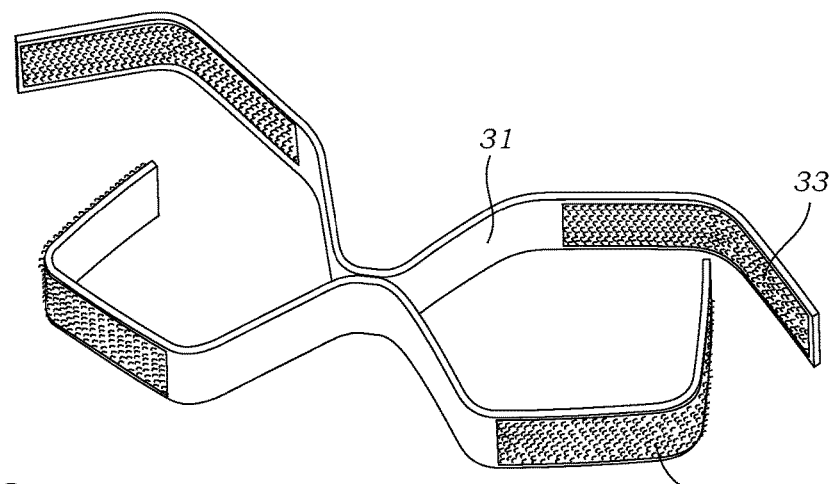
FIG. 8 is a cutaway view of a preferred of typical straps of a ring assembly.
Figure 9:
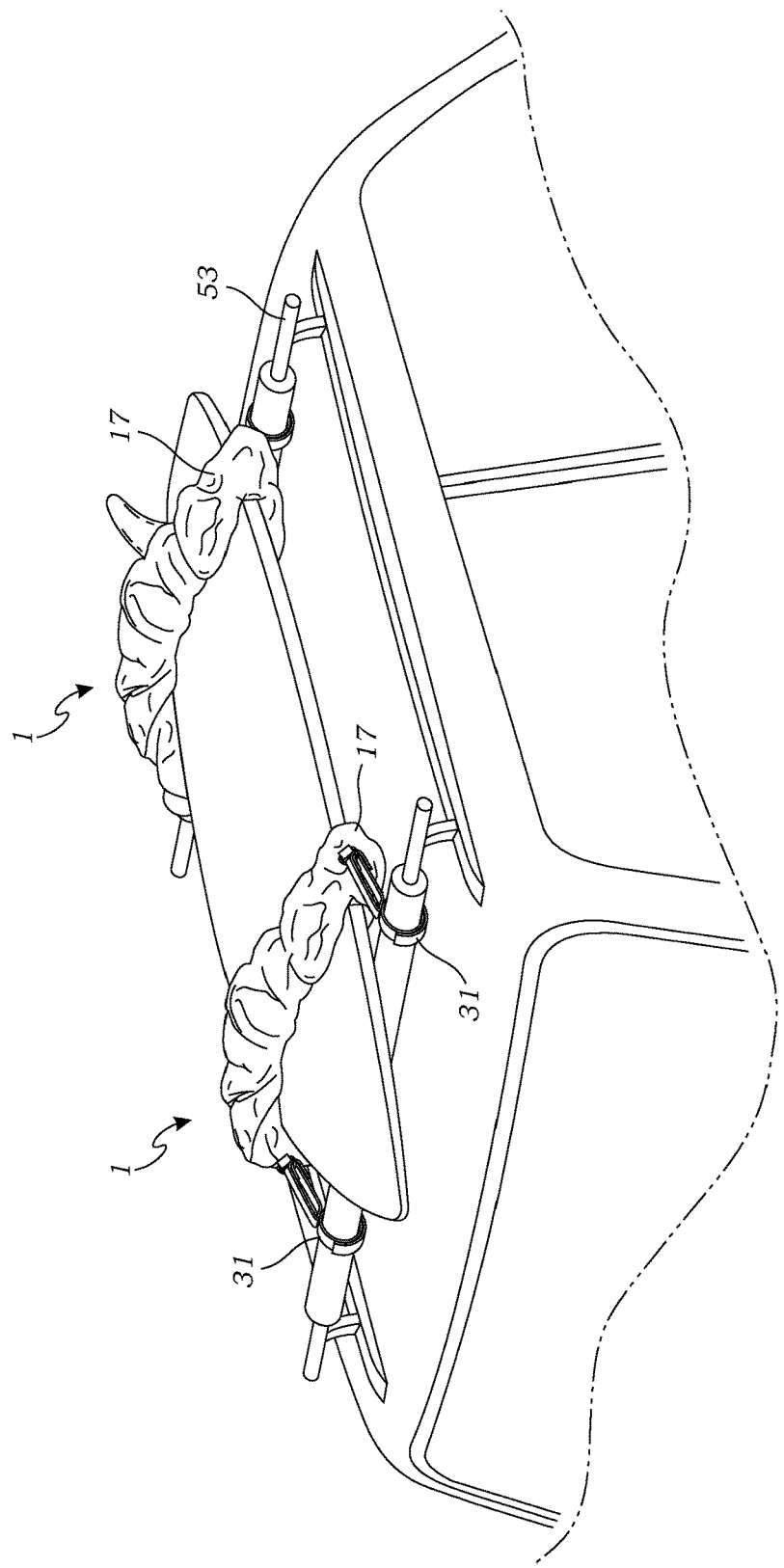
FIG. 9 is a perspective view of the surfboard carrier assembly affixed to a surfboard and to a vehicle's padded cross bars.

The ring assembly 1 further includes straps 31 affixed to opposite sides of the cover 17. The straps 31 can be constructed in any manner as can be determined by those skilled in the art so as to affix the cover 17 to a roof rack horizontal cross bar 53. As illustrated in FIGS. 1 and 8, preferred straps 31 are simply elongated fabric structures with first and second ends having respective hook and pile features for affixing together.

Figure 5:
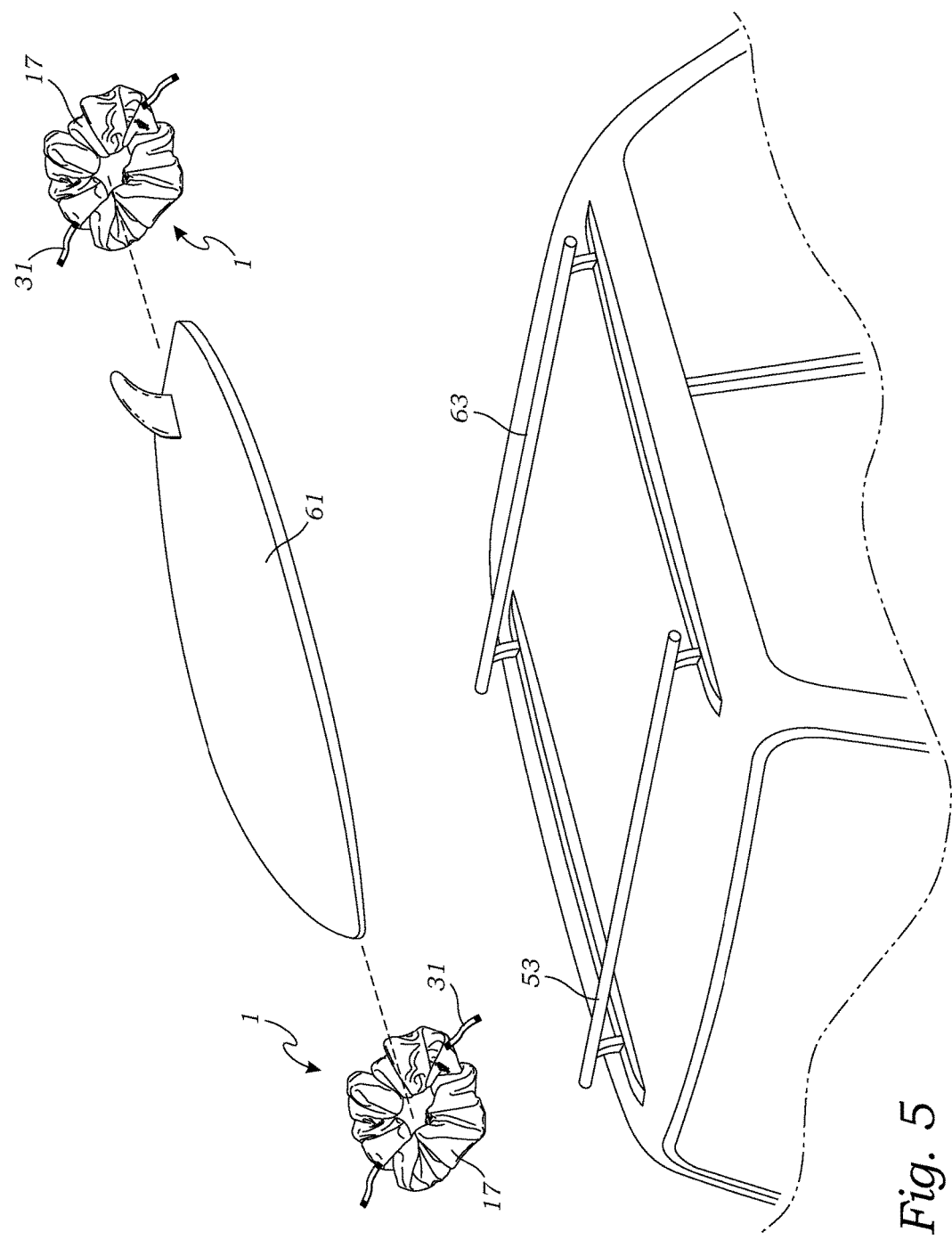
FIG. 5 is a perspective view of the surfboard carrier assembly illustrating its attachment to a surfboard.
Figure 6:
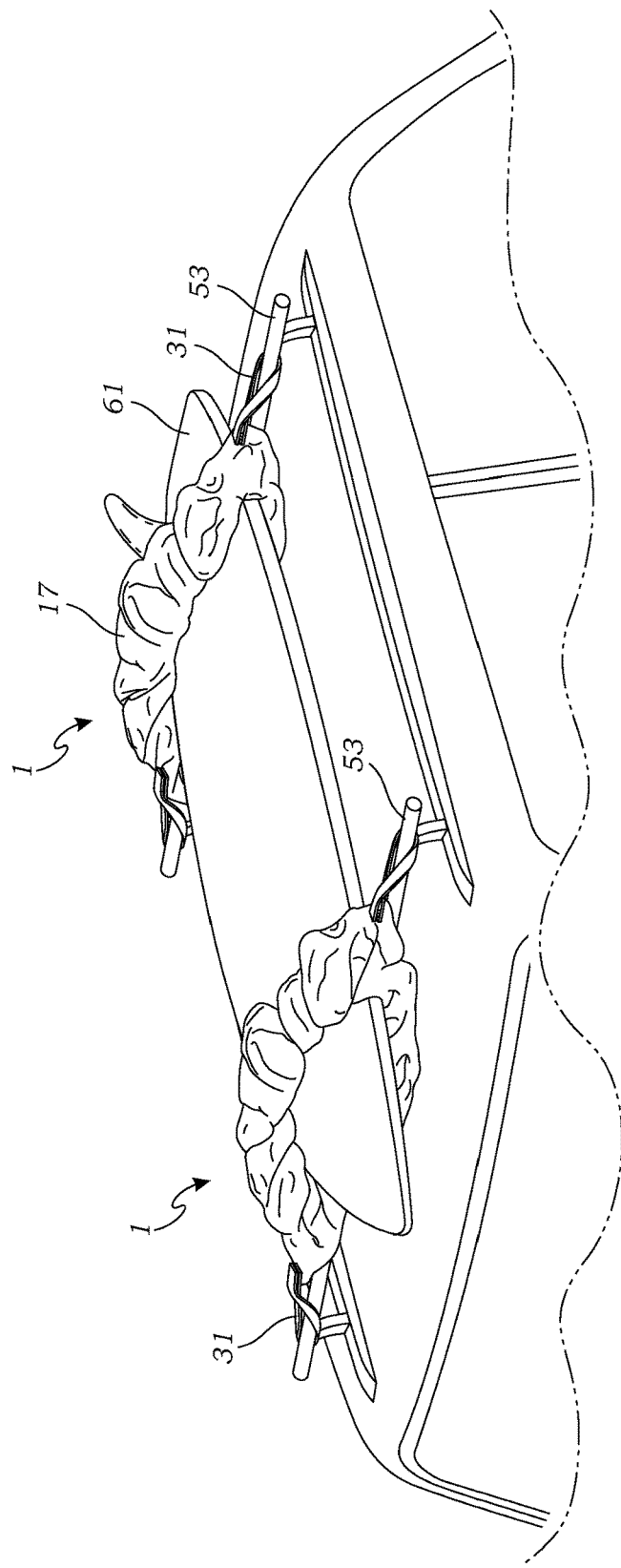
FIG. 6 is a perspective view of the surfboard carrier assembly affixed to a surfboard and to a vehicle's roof cross bars.

With reference to FIGS. 5 and 6, a surfboard 61 is affixed to vehicle roof rack cross bars 53 utilizing a pair of ring assemblies 1. In practice, a ring assembly 1 is affixed to each end of the surfboard 61 by simply inserting each end of the surfboard 61 through the center hole 11 of the respective carrier assemblies 1. The ring assemblies 1 are located along the surfboard at a distance equal to the distance between each of the roof rack cross bars 53. Importantly, the circumference of the surfboard 61 is greater than the circumference of the carrier assembly's cord 3 when the cord in a relaxed state, so that upon inserting each end of the surfboard 61 into a carrier assembly 3, the cord contracts to grab a respective end of the surfboard. If necessary, the cord can be tightened by adjusting the knot 7, or by sliding a clip (not shown) so as to shrink the cord's circumference 9. Once two carrier assemblies 1 are affixed to a surfboard 61, the carrier assemblies 1 are affixed to the roof rack crossbars 53 utilizing the straps 31 so as to firmly affix the surfboard to the vehicle's roof rack.

Figure 7:
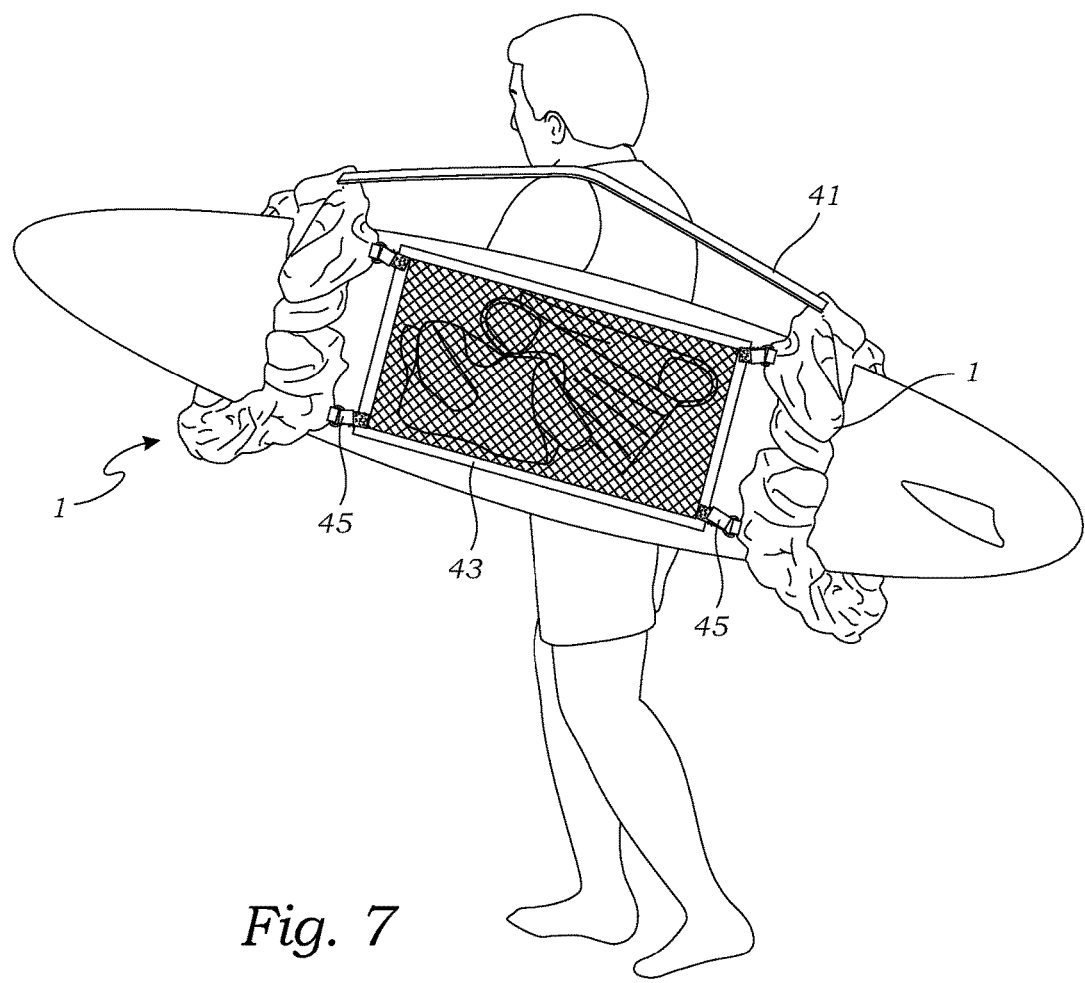
FIG. 7 is a perspective view of the surfboard carrier assembly of the present invention with a shoulder strap and supply bag.

With reference to FIG. 7, a pair of ring assemblies 1 can be utilized to enable a person to carry a surfboard. For this preferred embodiment, a shoulder strap 41 is provided which preferably has an adjustable length. The shoulder strap's ends are connected to respective carrier assemblies 1, and the shoulder strap 41 has a sufficient length so as to slide over a person's shoulder. As illustrated in FIG. 7, an additional preferred embodiment includes a carry bag 43 which connects a pair of ring assemblies 3. The carry bag can be of any type known to those skilled in the art. In the preferred embodiment illustrated in FIG. 7, the carry bag is a traditional rectangular mesh bag having four corners.

Preferably, the rectangular mesh bag 43 includes a clip 45 at each corner, with a pair of clips 45 affixing to the cover 17 of each ring assembly.

While several particular forms of the invention have been illustrated and described, it will be apparent that various modifications can be made without departing from the spirit and scope of the invention. Accordingly, it is not intended that the invention be limited except by the following claims.

The invention claimed is:

1. A surfboard carrier assembly comprising:
    a first ring assembly including a first circular loop made of an elastic cord, a first hollow doughnut shaped cover made of a flexible fabric which encapsulates said first loop, and a first pair of straps affixed to said first cover at about diametrically opposed locations upon said first cover; and
    a second ring assembly including a second circular loop made of an elastic cord, a second hollow doughnut shaped cover made of a flexible fabric which encapsulates said second loop, and a second pair of straps affixed to said second cover at about diametrically opposed locations upon said cover; and
    wherein each of said circular loops has an elongation greater than the elongation of each of said covers.

2. The surfboard carrier assembly of claim 1 wherein each of said circular loops is made of an elastic cord having an elongation of greater than 200%.

3. The surfboard carrier assembly of claim 1 wherein each of said circular loops is made of an elastic cord having an elongation of 200%-500%.

4. The surfboard carrier assembly of claim 1 wherein each of said circular loops has an adjustable circumference.

5. The surfboard carrier assembly of claim 1 wherein each of said circular loops has a circumference of two (2) feet or greater when in a relaxed state.

6. The surfboard carrier assembly of claim 1 wherein each of said covers is substantially rectangular and has opposed edges including a first edge having a hook surface and said second edge having a pile surface so as to enable each of said covers to form a doughnut shape so as to attach or detach from a corresponding loop.

7. The surfboard carrier assembly of claim 1 wherein each of said covers is made of nylon.

8. The surfboard carrier assembly of claim 1 wherein each of said covers is made of neoprene rubber.

9. The surfboard carrier assembly of claim 1 further comprising a shoulder strap having first and second ends, said first end affixed to said first ring assembly and said second end affixed to said second ring assembly.

10. The surfboard carrier assembly of claim 1 further comprising a rectangular storage bag having four corners, wherein two of said corners affix to said first ring assembly and two of said corners affix to said second ring assembly.

11. A vehicle surfboard carrier assembly comprising:
    a pair of elongate cross bars affixable to the roof of a vehicle;
    a first ring assembly including a first circular loop made of an elastic cord, a first hollow doughnut shaped cover made of a flexible fabric which encapsulates said first circular loop and wherein said first said circular loop has an elongation greater than the elongation of said first cover, and a first pair of straps affixed to said first cover at about diametrically opposed locations upon said first cover and each of said first pair of straps wrapping around and affixing to a first of said cross bars; and
    a second ring assembly including a second circular loop made of an elastic cord, a second hollow doughnut shaped cover made of a flexible fabric which encapsulates said second circular loop and wherein said second circular loop has an elongation greater than the elongation of said second cover, and a second pair of straps affixed to said second cover at about diametrically opposed locations upon said cover and each of said second pair of straps wrapping around and affixing to a second of said cross bars.

12. The vehicle surfboard carrier assembly of claim 11 wherein each of said circular loops is made of an elastic cord having an elongation of greater than 200%.

13. The vehicle surfboard carrier assembly of claim 11 wherein each of said circular loops is made of an elastic cord having an elongation of 200%-500%.

14. The vehicle surfboard carrier assembly of claim 11 wherein each of said circular loops has an adjustable circumference.

15. The vehicle surfboard carrier assembly of claim 11 wherein each of said circular loops has a circumference of two (2) feet or greater when in a relaxed state.

16. The vehicle surfboard carrier assembly of claim 11 wherein each of said covers is substantially rectangular and has opposed edges including a first edge having a hook surface and said second edge having a pile surface so as to enable each of said covers to form a doughnut shape so as to attach or detach from a corresponding loop.

17. The vehicle surfboard carrier assembly of claim 11 wherein each of said covers is made of nylon.

18. The vehicle surfboard carrier assembly of claim 11 wherein each of said covers is made of neoprene rubber.

* * * * *